United States Patent [19]

Erickson

[11] 4,381,204

[45] Apr. 26, 1983

[54] ADHESION OF RUBBER TO BRASS

[75] Inventor: David E. Erickson, Stow, Ohio

[73] Assignee: The General Tire & Rubber Company, Akron, Ohio

[21] Appl. No.: 328,050

[22] Filed: Dec. 7, 1981

Related U.S. Application Data

[62] Division of Ser. No. 152,235, May 22, 1980, Pat. No. 4,333,787.

[51] Int. Cl.$^3$ .............................................. A23F 5/00
[52] U.S. Cl. .................................. 148/6.31; 427/302; 134/2
[58] Field of Search ........................... 134/2; 427/302; 148/6.31

[56] References Cited

U.S. PATENT DOCUMENTS 259,721  6/1882  Richardson .
2,240,862  5/1941  Schade .
2,476,823  7/1949  O'Neil ...................................... 134/2

FOREIGN PATENT DOCUMENTS 405312  1/1934  United Kingdom ................ 427/302

OTHER PUBLICATIONS

The Chemical Formulary, vol. VII, Bennett, p. 376.

*Primary Examiner*—Sam Silverberg
*Assistant Examiner*—Mary Beth Calligaris

[57] ABSTRACT

The adhesion of brass plated steel cord to rubber is improved by treating the cord in a dilute acidic alcohol dip followed by treatment with $H_2S$ gas or by treating the cord in a dilute aqueous ammonia dip, preferably followed by treatment with $H_2S$ gas, before combining the cord with a vulcanizable rubber compound and vulcanizing the same.

4 Claims, No Drawings

ADHESION OF RUBBER TO BRASS

This is a division, of application Ser. No. 06/152,235 filed May 22, 1980.

This invention relates to the adhesion of rubber to brass, and more particularly, it relates to the adhesion of rubber to brass plated steel wire tire cord.

Applicant's copending U.S. patent application filed May 15, 1980, Ser. No. 150,103, and entitled "Adhesion of Brass to Rubber" discloses a process of treating brass with ammonium, Na, K and other salts of carboxylic acids to improve the adhesion of the brass to rubber.

BACKGROUND OF THE INVENTION

The bond between brass and rubber is believed to involve the formation of a thin layer of cuprous sulfide. During compounding and fabrication of the tire, the rubber picks up a small amount of water. Moreover, the presence of a layer of zinc hydroxide and/or oxide on the surface of the brass before use or the formation of zinc hydroxide and/or oxide by water in the rubber reacting with metallic zinc, leads to the very rapid growth of the cuprous sulfide layer and/or the formation of more zinc oxide and/or hydroxide. Some cuprous oxide, also, may be in these outer layers of the brass coating. These reactions are accelerated by the heat developed during operation of the tire. Thus, there is formed a relatively thick friable or weak layer of corrosion products where debonding can occur in said layer or between said layer and the brass and/or rubber strata.

Accordingly, it is an object of the present invention to overcome the difficulties alluded to above and to provide a method of treating brass to improve its adhesion to rubber.

Yet another object is to increase the resistance of the rubber-brass bond to degradation caused by heat and the presence of moisture.

A further object is to provide a brass-rubber composite exhibiting an improved brass-rubber bond.

Yet another object of this invention is to provide brass with a surface which is more amenable to bonding to rubber.

These and other objects and advantages of the present invention will become more apparent to those skilled in the art from the following detailed description and working examples.

SUMMARY OF THE INVENTION

According to the present invention the adhesion of brass plated steel cord to rubber is improved by treating the cord in a dilute acidic alcohol dip followed by treatment with $H_2S$ gas or by treating the cord in a dilute aqueous ammonia dip preferably followed by treatment with $H_2S$ gas. After treatment in the dips the cords should first be rinsed and dried before further treatment such as with the $H_2S$ gas.

It is believed that the improved results in adhesion are obtained because the dip in the acidic alcoholic solution or in the aqueous ammonia solution removes an outer surface layer(s) of oxides and/or hydroxides especially of zinc and increases the ratio of copper to zinc in the outer surface layer(s) of the brass plating on the steel cords. Some copper oxide, also, may be removed by the treatment. Subsequent treatment of the cord, particularly the acid treated cord, with $H_2S$ gas forms a thin sulfide layer on the surface of the brass to further improve adhesion in some cases.

DISCUSSION OF DETAILS AND PREFERRED EMBODIMENTS

Brass plated steel tire cords (wire), are well known for use in the belts and carcasses of passenger, truck and off-the-road tires and for other purposes like belts. The wire may be woven or non-woven filaments of steel, and the wire or cords when used in tires is usually called a fabric. The steel may be dipped, electroplated or otherwise coated with the brass as is well known. The brass plating should be complete although some iron may be exposed on commercially brass plated steel cords. Usually the brass is deposited as a thin coating on the steel, usually not over about 1.2% by weight of the steel. The brass may contain from about 60 to 95% by weight of copper, preferably from about 62 to 72% by weight of copper, and even more preferably in the upper portion of this range to obtain higher adhesion, the balance being essentially zinc except for very minor amounts of other elements or compounds as adventitious or alloying materials. For more information on brass please see "Encyclopedia Of Chemical Technology," Kirk-Othmer, 2nd Ed., Vol. 6, pages 183 to 265, 1965, Interscience Publishers, a division of John Wiley & Sons, Inc., New York.

The organic acid used should be soluble in the alcohol. Examples of acids that may be used are formic, acetic, propionic, butyric, valeric, caproic, caprylic, capric, lauric, maleic, fumaric, acrylic, methacrylic, itaconic, sorbic, crotonic, citraconic, oxalic, citric, cyclohexane carboxylic, m-toluic, o-toluic, p-toluic, glutaric, malonic, and benzoic acid and so forth. These acids have from 1 to 12 carbon atoms, from 1 to 3 COOH groups and consist of carbon, hydrogen and oxygen. Acetic acid is the preferred acid to use.

The alcohol employed with the carboxylic acid in the dip should be a liquid at room temperature (about 25 degrees C.) or have a melting point below about 25 degrees C. Examples of alcohols which may be used are methanol, ethanol, n-propanol, butanol, isopropanol, allyl alcohol, isobutanol, n-pentanol, isoamyl alcohol, tert-amyl alcohol, n-hexyl alcohol, cyclohexanol, n-octyl alcohol, octanol-2, n-decyl alcohol, benzyl alcohol, ethylene glycol and so forth. These alcohols have from 1 to 2 OH groups, from 1 to 10 carbon atoms and consist of carbon, hydrogen and oxygen. It is preferred to use methanol as the alcohol.

The organic acid is employed in an amount of from about 1 to 10% by weight in the alcohol to make the acidic alcohol dipping solution.

The aqueous ammonia dipping solution contains from about 0.2 to 5% by weight of ammonia ($NH_3$).

The brass plated steel cords are dipped in the dipping bath or solution for a period of time and at a temperature sufficient to remove all or at least a substantial amount of the corrosion products, such as oxides and hydroxides of copper and zinc and so forth, on the surface of or in the outer surface layers of the brass to improve the adhesion of the brass to the rubber. The time may vary from a few seconds to several minutes or more depending on the temperature, concentration and so forth. It is preferred to operate at about room temperature (ca 25 degrees C.) to avoid loss of water, solvent and so forth although in a properly sealed or other apparatus designed to limit loss of solvent or to permit its recovery, higher temperatures may be used.

After dipping the cords are desirably rinsed (dipped or washed) in water or acetone (or other ketones like methyl ethyl ketone, diethyl ketone, dibutyl ketone and so foth) for a time and at a temperature sufficient to remove the treating solution and by-products or the products of the reaction of the acid solution or ammonia solution with the surface of the brass coated cord. Temperatures should desirably be at about room temperature to prevent loss of the rinsing medium but higher temperatures can be utilized as set forth above if suitable precautions are taken.

The cords after rinsing are dried in nitrogen or other inert gas or in air provided the moisture content is low, preferably the gas or air should be dry, at temperatures sufficient to remove the solvents and other treating solution without formation of any appreciable amount of Cu or Zn oxides and/or hydroxides. Drying temperatures preferably may vary from about 25 to 200 degrees C.

After rinsing and drying the cords from the acidic alcohol treatment, and preferably also from the aqueous ammonia treatment, are treated with hydrogen sulfide ($H_2S$) gas for a time and at a temperature sufficient to form a thin sulfide layer on the surface of the brass. Thus, the times and temperatures will vary depending on the thickness of the sulfide layer desired and preferably are from about 1 to 10 minutes at from about 50 to 200 degrees C. The $H_2S$ may be made by reacting dilute sulfuric acid with iron sulfide, by reacting hydrogen and sulfur in the vapor phase, by reacting sulfur with paraffin and by other methods. The $H_2S$ should be dry or essentially dry, e.g., free of moisture, before contacting the cord.

The treated cord can be combined (calendered, coated, laminated and so forth) with a curable rubber compound and cured (vulcanized). Alternatively, the cord may be stored such as in an inert or dry atmosphere until needed for use.

The rubber to which the treated cord is to be bound is preferably natural rubber or polyisoprene. However, blends thereof with other rubbery polymers like rubbery butadiene-styrene copolymers and/or polybutadiene can be used. For products other than tires there can be used nitrile rubber, polychloroprene and so forth. These rubbers can be suitably compounded with carbon black, silica (preferably dried), zinc oxide, stearic acid, antioxidants, accelerators, resins, sulfur and so forth.

Brass plated steel tire cords treated according to the present invention can be used in the belts and carcasses of passenger, truck and off-the-road tires, in belts and hose and for other purposes.

The following examples will serve to illustrate the present invention with more particularity to those skilled in the art.

In these examples to test the treated cords, the specimen cords were cut and without a solvent wash were embedded in a rubber compound. The rubber compound was ⅜" thick and backed with metal strips to reduce rubber deformation. The single end pullout force was measured on an Instron tester at 5 inches per minute using a special slotted jig to hold the sample (Coates and Lauer, "Rubber Chemistry & Technology," 1972, Vol. 45, No. 1, page 16). Each sample contained 16 cords. Also, humid aged tests were carried out on the sample after every other wire had been pulled (in other words after half the wires were pulled, the sample was humidity aged and then the remaining wires were tested), or on alternative samples. In any event, the reported values for adhesion are the average of 16 pulls and are reported in Newtons (N). The samples of the rubber compounds containing the wire cords embedded therein were cured in a mold at 153 degrees C. for 35 minutes.

For humidity aging the rubber samples containing the embedded cords were placed in aluminum cylinders containing 100 cc of liquid water at the bottom of the cylinder, purged with nitrogen 3 times and sealed. The samples were on a screen in the cylinder above the liquid water. The sealed cylinders containing the samples, water and nitrogen were then aged for 72 hours in a hot air oven at 121 degrees C. After this period of time, the samples were removed from the oven and from the cylinders and stored wet in bags until testing which was conducted within a few hours after removal from the oven.

Adhesion tests for the unaged and humid aged samples were conducted at room temperature (about 25 degrees C.).

The rubber compound used to make the samples for the adhesion tests comprised the following ingredients:

| Ingredient | Parts by Weight |
| --- | --- |
| Natural rubber | 100 |
| FEF carbon black | 30 |
| Silica ("Hi-Sil," precipitated, hydrated silica, PPG Industries, Inc.) | 15 |
| Zinc oxide | 20 |
| Stearic acid | 1.5 |
| N—(1,3-Dimethylbutyl)-N'—phenyl-p-phenylenediamine ("Santoflex" 13, Monsanto, Organic Division, Rubber Chemicals) | 2 |
| "Cohedur" RL, 1 to 1 parts by wt. mixture of resorcinol and "Cohedur" A, which is the pentamethyl ether of hexamethylol melamine, with a small amount of dibutyl phthalate plasticizer for viscosity control. Naftone, Inc. | 4.6 |
| N,N—dicyclohexyl-2-benzothiazyl sulfenamide ("Vulkacit" DZ, Mobay Chemical Co.) | 1.3 |
| Sulfur (Rubbermakers Grade) | 3.0 |

Research grade chemicals were used.

The $H_2S$ used was obtained by dripping a 5% $H_2SO_4$ aqueous solution onto $K_2S$ with the $H_2S$ gas evolved passing through "Drierite" (a desiccant) before contacting the treated brass-plated steel wire cord. The $H_2S$ pressure during treatment of the cord was maintained at slightly more than one atmosphere.

EXAMPLE I

Enka B brass plated steel wire tire cord (7×4×0.20 mm, 6±2 g brass/kg of wire, 67.5%±3.5% copper in the brass) was treated by various procedures, and the results obtained are shown in Table I, below:

TABLE I

| Run No. | Treatment Of The Brass-Plated Steel Wire Cord | Unaged Adhesion (N), (Coverage)[1] | Humid Aged Adhesion (N), (Coverage)[1] |
| --- | --- | --- | --- |
| 1 | None - Control | 921(9) | 158(1) |

TABLE I-continued

| Run No. | Treatment Of The Brass-Plated Steel Wire Cord | Unaged Adhesion (N), (Coverage)[1] | Humid Aged Adhesion (N), (Coverage)[1] |
|---|---|---|---|
| 2 | 5 min. wash with 5% acetic acid in methanol, acetone rinse, dried with nitrogen at 25 degrees C. | 658(6) | 339(3) |
| 3 | Same treatment, followed by 5 min. $H_2S$ treatment at 100 degrees C. | 798(8.5) | 425(6) |
| 4 | 5 min. wash with 1% $NH_3$ in water, followed by acetone rinse, nitrogen dry at 25 degrees C. | 905(8) | 250(3) |
| 5 | Same treatment, followed by 5 min. $H_2S$ treatment at 100 degrees C. | 847(9) | 290(4) |

Note 1:
Coverage - Rubber coverage, 0 = cord bare after being pulled from rubber; 10 = cord completely covered with rubber after being pulled from the rubber.

EXAMPLE II

Enka Z brass plated steel wire tire cord ($7 \times 4 \times 0.20$ mm + $1 \times 0.15$ mm, $6 \pm 2$ g brass/kg of wire, $67.5\% \pm 3.5\%$ copper in the brass) was treated by various procedures, and the results obtained are shown in Table II, below:

TABLE II

| Run No. | Treatment Of The Brass-Plated Steel Wire Cord | Unaged Adhesion (N), (Coverage) | Humid Aged Adhesion (N), (Coverage) | % Adhesion Change |
|---|---|---|---|---|
| 6 | None - Control | 776(8.5) | 510(4.5) | −35 |
| 7 | 5 min./5% acetic acid in water, acetone rinse, nitrogen dry at 25 degrees C. | 694(5.5) | 601(8.5) | −14 |
| 8 | Same, but 5% acetic acid in methanol | 797(8) | 703(8.5) | −12 |
| 9 | 5 min./1% $NH_3$ in water, acetone rinse, nitrogen dry at 25 degrees C. | 858(9) | 673(8.5) | −22 |
| 10 | Same, followed by 5 min. $H_2S$ treatment at 100 degrees C. | 690(8.5) | 597(8.5) | −14 |
| 11 | 30 seconds/1% $NH_3$ in water, acetone rinse, nitrogen dry at 25 degrees C. | 759(8) | 649(8) | −14 |
| 12 | Same, but water rinse, hot blower air dry at @ 171 degrees C. | 743(8.5) | 657(7.5) | −12 |

EXAMPLE III

Bekaert brass plated steel wire tire cord ($7 \times 4 \times 0.20$ mm, $6 \pm 2$ g brass/kg of wire, $67.5 \pm 3.5\%$ copper in the brass) was treated by various procedures, and the results obtained are shown in Table III, below:

TABLE III

| Run No. | Treatment Of The Brass-Plated Steel Wire Cord |
|---|---|
| 13 | None - Control |
| 14 | 5 min. wash with 5% acetic acid in methanol, acetone rinse, nitrogen dry at 25 degrees C. |
| 15 | Same, followed by 5 min. $H_2S$ treatment @ 100 degrees C. |
| 16 | None - Control |
| 17 | 5 min. wash with 5% acetic acid in methanol, acetone rinse, nitrogen dry, 5 min. $H_2S$ treatment @ 100 degrees C. |
| 18 | 5 min. wash with 1% $NH_3$ in water, acetone rinse, nitrogen dry at 25 degrees C. |
| 19 | Same, but hot blower air dry at @ 171 degrees C. |

| Run No. | Unaged Adhesion (N), (Coverage) | Humid Aged Adhesion (N), (Coverage) | % Adhesion Change |
|---|---|---|---|
| 13 | 631(5) | 562(5) | −11 |
| 14 | 420(2) | 539(3) | +28 |
| 15 | 885(9) | 630(7) | −29 |
| 16 | 947(9) | 334(5) | −65 |
| 17 | 927(9.5) | 406(4) | −56 |
| 18 | 896(8.5) | 439(5) | −51 |
| 19 | 863(8) | 471(6) | −46 |

Note:
The rubber compound used in Runs 13 to 15 was old and may have had a relatively high water content as compared to the rubber compound of Runs 16 to 19.

I claim:

1. The method which comprises treating brass plated steel cord in an aqueous ammonia solution containing from about 0.2 to 5% by weight of ammonia for a time and at a temperature sufficient to remove at least a substantial amount of the corrosion products on the outer surface layers of said cord, rinsing said cord and drying the same treating said aqueous ammonia treated, rinsed and dried cord with $H_2S$ gas for a time and at a temperature sufficient to provide a thin sulfide layer on the surface of said cord and storing said treated cord in an inert or dry atmosphere.

2. The method according to claim 1 where said $H_2S$ treatment is conducted for from about 1 to 10 minutes at a temperature of from about 50 to 200 degrees C.

3. The method according to claim 1 containing the additional step of combining said finally treated cord with a vulcanizable rubber compound and vulcanizing the same.

4. The method according to claim 1 containing the additional step of combining said finally treated cord with a vulcanizable rubber compound and vulcanizing the same.

* * * * *